United States Patent
Austin et al.

(10) Patent No.: US 11,226,919 B1
(45) Date of Patent: Jan. 18, 2022

(54) COMMUNICATION LINK RECOVERY

(71) Applicant: Amazon Technologies, Inc., Reno, NV (US)

(72) Inventors: Bradshaw Darrow Austin, University Place, WA (US); Jian Liu, Pleasanton, CA (US); Jiming Sun, Issaqua, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/909,308

(22) Filed: Jun. 23, 2020

(51) Int. Cl.
| | |
|---|---|
| *G06F 13/42* | (2006.01) |
| *G06F 13/40* | (2006.01) |
| *G06F 11/14* | (2006.01) |
| *G06K 9/62* | (2006.01) |
| *G06F 9/4401* | (2018.01) |

(52) U.S. Cl.
CPC ........ *G06F 13/4221* (2013.01); *G06F 9/4406* (2013.01); *G06F 11/1438* (2013.01); *G06F 13/4027* (2013.01); *G06K 9/6256* (2013.01); *G06F 2213/0026* (2013.01)

(58) Field of Classification Search
CPC ............. G06F 13/4221; G06F 13/4027; G06F 9/4406; G06F 11/138; G06K 9/6256
See application file for complete search history.

(56) References Cited

U.S. PATENT DOCUMENTS

| | | | | |
|---|---|---|---|---|
| 10,659,337 | B2* | 5/2020 | Riani | H04L 43/0823 |
| 10,681,145 | B1* | 6/2020 | Eiriksson | H04L 69/40 |
| 2005/0152268 | A1* | 7/2005 | Lesartre | H04L 1/24 |
| | | | | 370/216 |
| 2018/0129623 | A1* | 5/2018 | Klacar | G06F 13/4027 |
| 2018/0285227 | A1* | 10/2018 | Sharma | H04L 69/323 |
| 2019/0361763 | A1* | 11/2019 | Bakshi | A61N 1/378 |

* cited by examiner

*Primary Examiner* — Henry Tsai
*Assistant Examiner* — Christopher A Daley
(74) *Attorney, Agent, or Firm* — Hogan Lovells US LLP

(57) ABSTRACT

Communication links, such as peripheral component interconnect express (PCIe) links between two PCIe-compatible devices, can be checked during a boot process to determine whether those links were established and trained successfully. Firmware, such as Basic Input/Output System (BIOS), can be programmed to determine links for which there are PCIe devices, and determine whether those links were established with the correct values for one or more connection parameters (e.g., speed and width). If one or more of these links was not established with the correct parameter values, the BIOS can perform up to a maximum or threshold number of retrain attempts. If those retrain attempts are unsuccessful, the BIOS can attempt up to a maximum or threshold number of reboot attempts. If, after a maximum number of reboot actions, one or more links still have not been established and trained successfully, a remedial action can be taken.

18 Claims, 6 Drawing Sheets

COMMUNICATION LINK RECOVERY

BACKGROUND

As an ever-increasing amount of data is being transmitted and processed electronically, there is a corresponding desire to improve the performance of these tasks. Various protocols are used to manage the transmission of data between source and destination locations. A protocol such as the peripheral component interconnect express (PCIe) protocol can be used, which is an interface standard for connecting high-speed components. A motherboard on a conventional computing device might include a number of PCIe slots that can be used to add PCIe-compatible devices, such as graphics processing units, Wi-Fi cards, storage devices, and the like. In many instances the links between these various devices may not be properly trained or available, which can be difficult or costly to detect and remedy in various implementations.

BRIEF DESCRIPTION OF THE DRAWINGS

Various embodiments in accordance with the present disclosure will be described with reference to the drawings, in which.

DETAILED DESCRIPTION

Approaches in accordance with various embodiments provide for the management of data connections in a computing environment. In particular, various embodiments can identify links that were not established and trained successfully, and can attempt to automatically retrain or recover those links. These links can include any appropriate types of links for communicating data between two devices or components, as may include a peripheral component interconnect express (PCIe) link between two PCIe-compatible devices. In various embodiments, firmware such as Basic Input/Output System (BIOS) can be programmed to perform PCIe link training during a boot phase of a computing device. The firmware can determine links for which there are PCIe devices, and determine whether those links were established successfully. A link may not be established when a PCIe device is not detected, for example, or where a device is detected but a corresponding link does not have connection parameters successfully negotiated or otherwise fails to be provided successfully whereby that PCIe device is unable to communicate with a device on the other end of that link. In at least some embodiments, the BIOS can further determine whether established links were successfully trained, such as to have the appropriate connection parameters (e.g., speed and width). If one or more of these links was not established and trained correctly, the BIOS can perform up to a maximum or threshold number of retrain attempts. If those retrain attempts are unsuccessful, the firmware can attempt up to a maximum or threshold number of reboot attempts. These attempts at retraining the links will provide for successful link recovery for many devices and implementations. If, after a maximum number of reboot attempts, one or more links still have not been established and trained successfully, a remedial action can be taken, such as to notify a technician, stop the boot process, or remove the computing device from service. In at least some embodiments, failures will be logged for subsequent evaluation.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

Figure 1:
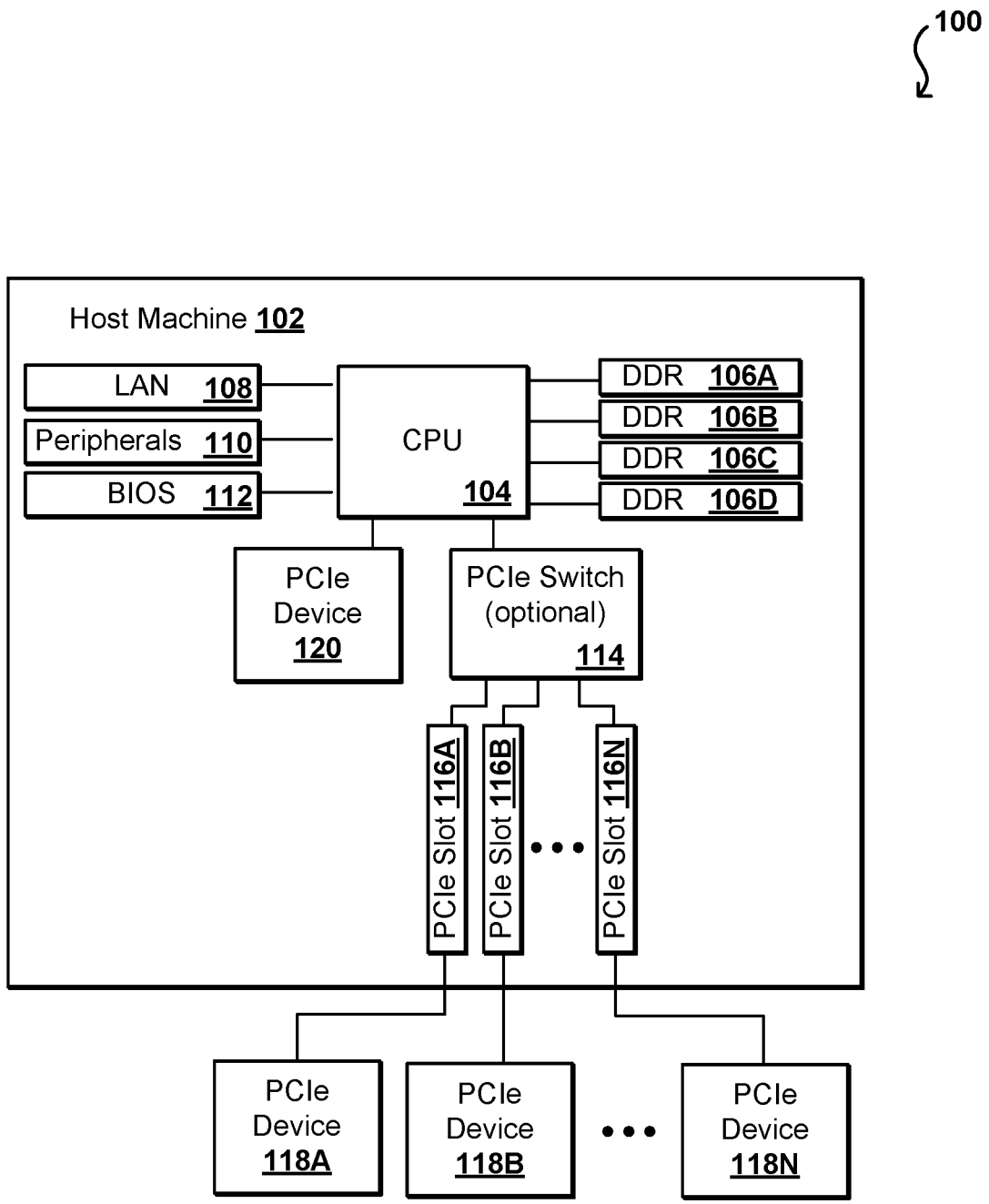
FIG. 1 illustrates components of an example computing device that can be utilized in accordance with various embodiments.

In many computer environments, there will be various components that will need to transfer data to other components, of various types and at various locations. FIG. 1 illustrates an example environment 100 in which components on a host machine 102 may communicate with other components on, or external to, the host machine 102. In order to facilitate communications between different types of components (or systems, devices, etc.), various standards can be utilized. As mentioned above, one such standard is the PCIe protocol. As with other protocols, PCIe imposes rules on transactions traveling through a PCIe fabric. These rules help to ensure that the various transactions are completed successfully, to avoid data loss or corruption, deadlocks, and other such issues. For conventional PCIe there are three types of transactions, including I/O transactions (e.g., for deprecated legacy PCI devices), memory transactions, and config transactions. Other types of packets or transactions can be utilized for the same or other protocols or standards within the scope of the various embodiments. In the present example, a PCIe device can perform actions such as to write data to, and read data from, memory (such as DDR memory 106A-D) on the host device.

PCIe can manage the way in which components of a host machine 102 communicate with other PCIe-compatible devices, which can each act as an endpoint for communications. There can be various types of high-speed devices that can function as PCIe devices, such as may include graphics cards, RAID cards, Wi-Fi cards, or solid-state drive add-on cards, among other such options. In some embodiments a central processing unit (CPU) 104 of a host machine can communicate directly with a PCIe device 120, which in other embodiments or implementations a CPU 104 might communicate, selectively, with multiple PCIe devices 118A though 118N via one or more PCIe switches 114. A PCIe switch 114 can select between different channels of a PCIe bus, where each physically connected PCIe device 118A-N communicates over a different channel, and only the device associated with the actively selected channel can communicate over that bus at any given time. In at least some embodiments, these PCIe devices 118A-N are physically connected to host device 102 via an array of PCIe slots 116A-N configured to receive, for example, PCIe cards. As mentioned, however, different communication protocols can be utilized that may have different connections and configurations. The host machine 102 can communicate through a PCIe interface in at least some embodiments, such as may include any appropriate I/O device. This can include, as mentioned, I/O, memory, and configuration transactions. The PCIe devices can include any appropriate components, as may include a processor and memory that can assist in connection and transaction management, while at least some of this management can be performed on a CPU 104 of the host machine, among other such options. The CPU may use other protocols to communicate with other components as well, such as to communicate with a local area network (LAN) card 108 or various peripherals 110, etc. As mentioned, this may include a transaction such as a read transaction, which includes a request to read data and a response that includes the requested data, received over the appropriate channel. The host machine can also include firmware, such as a Basic Input/Output System (BIOS) 112, or flash RAM, component that stores instructions and data to be utilized when booting, or rebooting, host machine 102. Various components of host machine 102 can communicate using one or more communication buses as discussed in more detail with respect to FIG. 2. When host machine 102 goes through a boot, the BIOS 112 will manage the boot process without any users or operating systems executing on the host, until such time as the boot process has completed successfully and a processor such as a main CPU 104 can execute an operating system and perform various tasks on host machine 102. While in many embodiments host machine 102 will be a server, this machine could include various other types of computing devices or systems as well.

As mentioned, such a computing device will often go through a boot process, driven by system BIOS, that performs various tasks and checks before enabling an operating system (OS) to execute on the device and allow for user access. For at least some computing devices, this will involve training communication links in the system, such as PCIe links associated with PCIe devices, among other such links and devices as discussed and suggested herein. For PCIe devices, link training typically involves causing two PCIe-compatible devices on opposite ends of a link to exchange training sequences in order to negotiate a number of link parameters, as may include link speed and width, where width can correspond to a number of lanes for communications over that link. Other interfaces for connecting high-speed components may have different parameters or negotiation processes. The types of PCIe slots may vary, as different slots may provide different numbers of lanes, such as x1, x4, x8, x16, or x32, where the number after the "x" refers to the number of lanes available for data transmission. Different slots or devices may also provide different speeds, which for PCIe are determined by a respective generation, such as generations 1.0, 2.0, 3.0, or 4.0. During a link training process, these parameters need to be negotiated successfully, and the values of these negotiated parameters need to be accurate for the link and connected devices.

It may be the case that during a boot of a computing device that one or more cards or devices may fail to link train. In such a situation, the system will boot but the card or device does not link successfully, such that the card would not be detected from, for example, a PCI configuration space. In that situation, the card or device then cannot be used for communication with the rest of the system, at least over a PCI interface. For simplicity of explanation, such cards or devices will simply be referred to as "devices" going forward. In addition to the device being unavailable for communication, there may not be anything to indicate that a device failed to link successfully, and there may also not be an easy way to diagnose the unavailability of a link to a specific device.

Accordingly, approaches in accordance with various embodiments provide automatic retraining and recovery of communication links and interfaces in a computing environment. In at least one embodiment, such functionality can be added via code in the system BIOS that can be executed during a boot process. Such functionality can enable the BIOS to determine when a device, such as a PCIe device is present, such as by a PCIe card being plugged into a PCIe slot. The BIOS can determine that a device is present, and can also determine whether a link has been successfully established, in that it at least exists and is operational for at least some amount of communication between the intended devices. In at least some embodiments, the BIOS can also determine whether this link was negotiated with the appropriate connection parameters. If the link has not been so established then the BIOS can attempt to retrain the link, such as by using conventional PCIe registers to attempt to retrain or renegotiate a PCIe link to a specific PCIe device that has been determined to be present. In at least some embodiments, this may involve up to a maximum number of retrain attempts, followed by up to a maximum number of system reboot actions. Such actions should be sufficient to retrain the link in many situations. If the link is unable to be retrained successfully after a series of retrains and reboots then a remedial action can be taken, such as to remove the computing device from network operation and submit a request or log entry (e.g., a system event log (SEL) entry) for manual examination.

In at least some embodiments, the maximum number of retrain attempts or reboots can be configurable, and in some cases may be determined dynamically based upon factors such as current load or network conditions. In at least one embodiment, up to three retrain attempts can be made for each boot attempt, and up to three boot attempts can be made. In some embodiments each of these maximum numbers should be set high enough to provide sufficiently high probability of successful link training, while not be so high as to take an unreasonable amount of time before taking remedial action in the case of a problematic device or link, etc. A maximum number can be further desirable to implement in order to prevent a device being stuck in a boot process, or continually rebooting in the event of a bad link and thus being unavailable, such as in the case where a PCIe card was physically removed from a slot. Various embodiments also provide logging for each such event, in order to be able to identify potential issues or trends with specific devices, types of devices, boot procedures, etc.

In at least some embodiments, such retraining steps can also be performed for links that may be active and trained, but may have been trained at a degraded state, or where performance may otherwise be sub-optimal. For example, a given link may have been trained with a lower or different speed, width, or other connection parameter than was intended. In at least some embodiments, the BIOS can include code to detect that a link has been trained in a degraded state, and can attempt to retrain the link in the proper state with proper values for one or more connection parameters. In at least some embodiments, such a process does not depend upon a type of device to be connected via this link, and in some embodiments may the process may not involve a determination or identification of the type of device. During the link training process the connection parameters for the device can be determined, and this information can be stored at least temporarily until it is determined that the link has trained successfully with the desired state.

In some embodiments, a determination as to whether to retrain a link can be performed by evaluating registers of a respective bridge or PCI bus. First, the register values can be analyzed to determine whether the link capability register matches the link status register. This can include determining whether one or more connection parameters were established with proper values for the connection. In one embodiment for a PCIe link, the link capability can provide the maximum width and speed values for a given PCIe slot. The link capability can then be compared against the link status, which is the width and speed at which the link was trained. If these values match, and are thus determined to be the proper values for these connection parameters, then it can be determined that the link was trained in the desired state. In at least some embodiments, the process does not read the PCIe device to determine its status, as it can be assumed that the PCIe device is capable of meeting the capabilities of the respective host bridge. If the link capability does not match the link status, then a request can be sent to the PCIe device, or card, to request its link capability, as the limitation may be due to the PCIe device itself. This might be the case where, for example, a host bridge is capable of a generation 4.0 speed, but the PCIe device on the other end of the link is only capable of a generation 3.0 speed. Once the maximum speed of the device is determined, the link can be retrained with a generation 3.0 speed as the proper value for this connection parameter, and the state evaluation should pass successfully. This can be particularly useful in a user-accessible system where types of PCIe devices to be utilized may be unknown, such that it may be necessary to teach the BIOS about the capabilities or limitations of the hardware. In at least some embodiments, another component such as a baseboard management controller (BMC) or unified extensible firmware interface (UEFI) could perform the testing, but utilizing the BIOS to read the appropriate registries and communicate with the devices as appropriate can provide better performance for at least some implementations.

Figure 2:
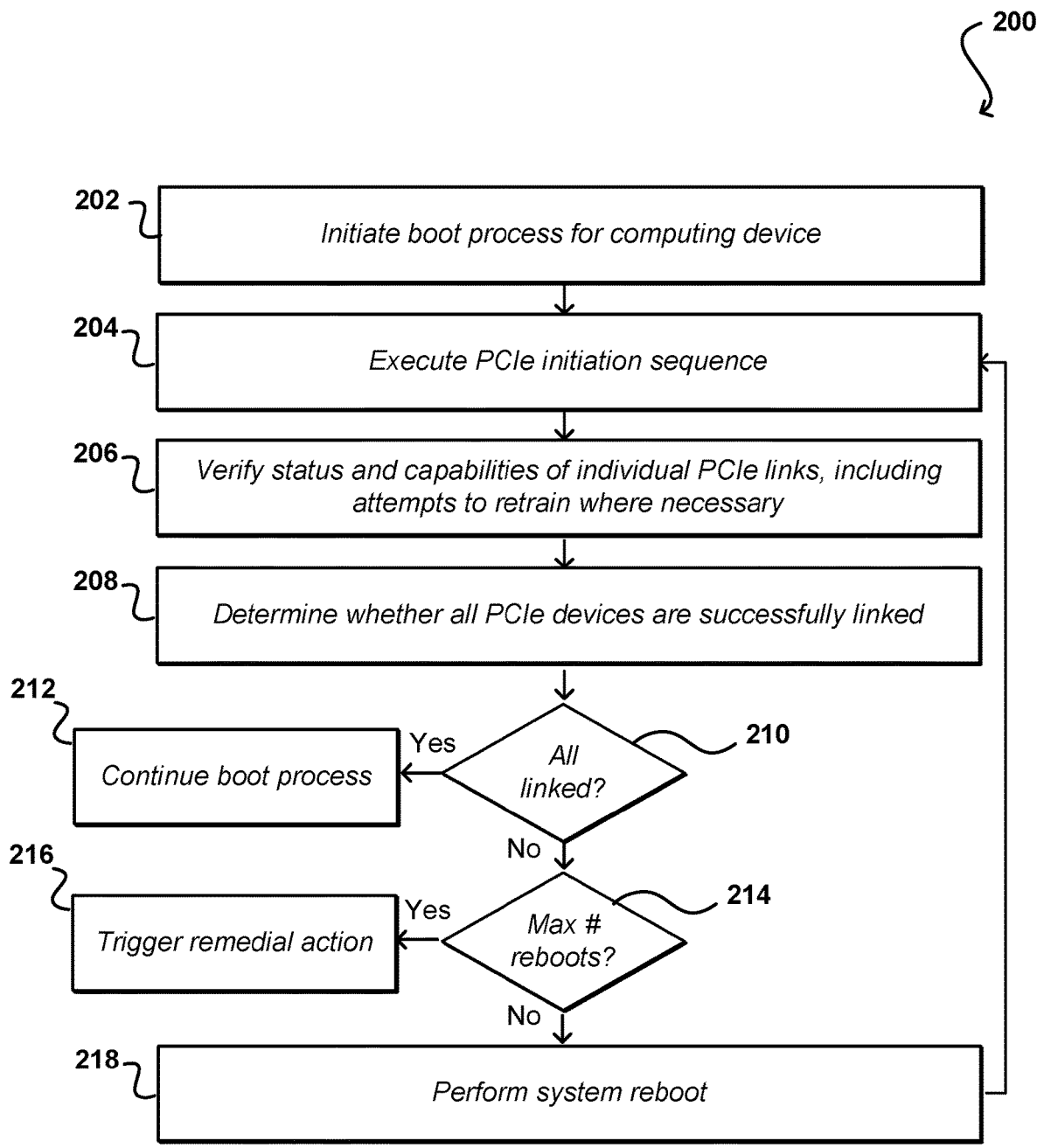
FIG. 2 illustrates an example process for attempting to verify links between components that can be utilized in accordance with various embodiments.

FIG. 2 illustrates an example process 200 for performing link recovery that can be utilized in accordance with various embodiments. It should be understood for this and other processes discussed herein that there can be additional, alternative, or fewer steps performed in similar or alternative orders, or in parallel, within the scope of the various embodiments unless otherwise stated. Further, although PCIe operations are used as an example, it should be understood that various other types of operations or functionality can benefit from aspects of the various embodiments as well, as would be apparent to one of ordinary skill in the art in light of the teachings and suggestions contained herein. In this example, a boot process is initiated 202 for a computing device. In this example, the boot process is managed by system BIOS before an operating system is executing on the computing device. During the boot process, a PCIe initiation sequence can be executed 204. In this process, links for each of a number of PCIe devices can be trained for communication according to the negotiated parameters. As part of the link training process, the BIOS can attempt to verify 206 the status (e.g., whether successfully connected) and one or more capabilities or states of these individual PCIe links. The BIOS can attempt to retrain these links where necessary or appropriate, as discussed in more detail in the flowchart of FIG. 4. In at least some embodiments, this can involve the BIOS applying a workaround to each PCIe device that it discovers on the system.

Further, in at least one embodiment the correct parameters will be the highest parameters that are achievable by the devices on both ends of the connection, as well as the physical link.

In this example, the BIOS can determine 208 whether all PCIe devices were successfully linked during the training process, or that all such links were trained properly. If it is determined 210 that all such devices are linked, then the boot process can continue 212. Otherwise, a determination can be made as to whether to attempt a system reboot or take another remedial action. In this example, it is determined 214 whether a maximum number of reboots has been performed due, at least in part, to link retraining. As mentioned, this may be a maximum number such as three reboot attempts. If it is determined 214 that the maximum number of reboots has been performed, and there is still at least one problematic link, then a remedial action can be triggered 216. In some embodiments, this may involve stopping the boot process. In other embodiments, this may at least involve generating an alert, notification, or log event indicating that the link was not properly trained, such that a technician may be called to investigate, the system can be taken offline, or another such action can be taken. In some embodiments, the action to be taken may depend upon factors such as current network conditions or workload, or the type of device that is unavailable, or available with degraded performance, over that link. For example, if the computing device is not fully utilized and users can easily be migrated to other resources then a determination may be made to take this device offline for repair, while if the load is heavy and it would be difficult or inconvenient to migrate users, then the device may be allowed to boot without a valid link and the error may be logged for subsequent action. If a maximum number of reboots has not yet been reached, a system reboot can be performed 218 and the process can continue with another round of attempted link training. In at least one embodiment, a counter value can be updated in protected memory for each reboot, where that counter can be reset as appropriate, such as upon a first reboot attempt for a subsequent retraining attempt.

Figure 3:
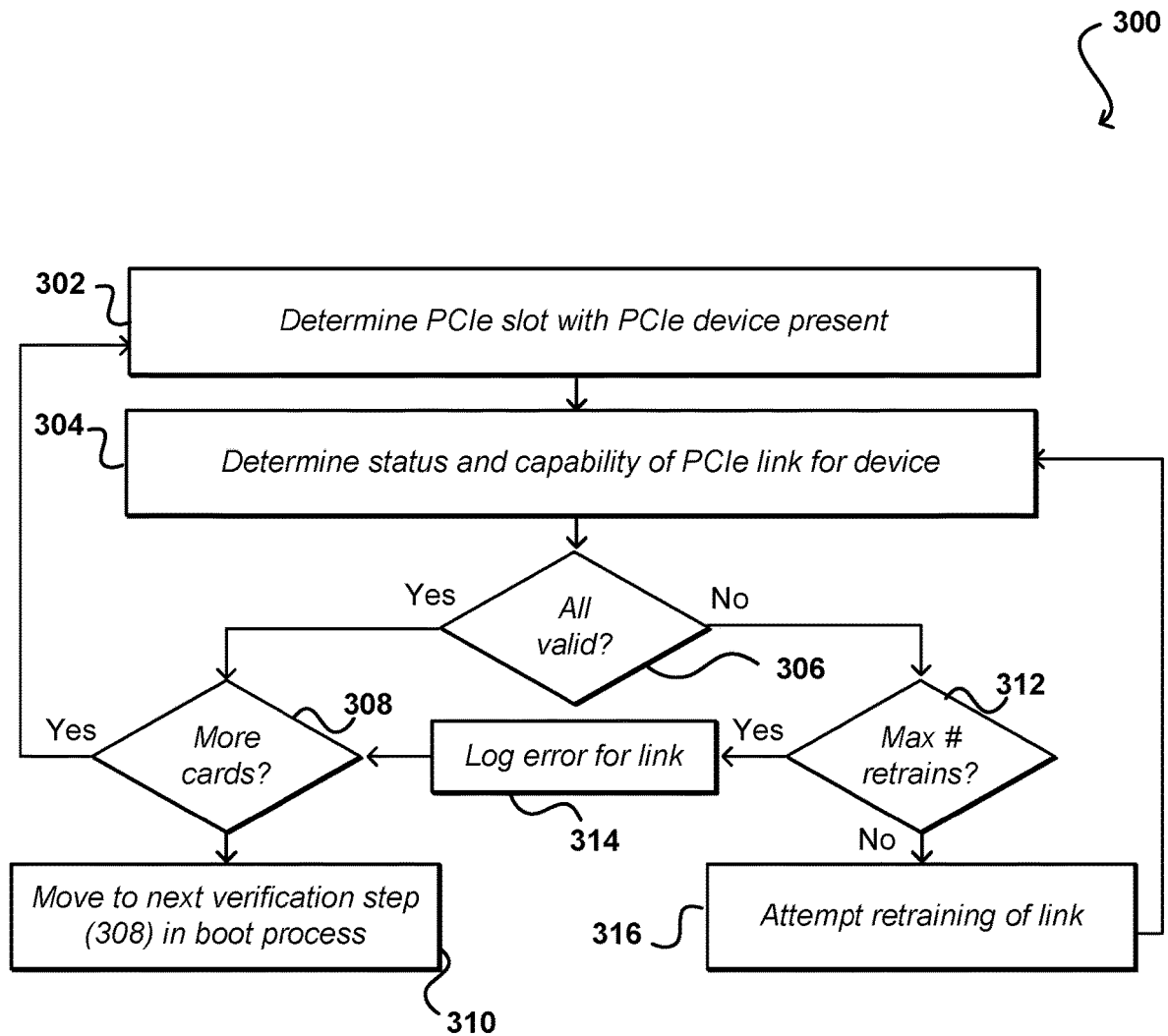
FIG. 3 illustrates an example process for retraining communication links that can be utilized in accordance with various embodiments.

FIG. 3 illustrates an example process 300 for attempting to retrain a communication link that can be utilized in accordance with various embodiments. This process can be performed as part of the verify status and capabilities step 206 of FIG. 2. In this example, which may be executed during a boot process managed by system BIOS, a PCIe slot (or other endpoint) can be determined 302 for which a PCIe device is present. The BIOS can utilize information in the appropriate registries to determine 304 the status and capability of the PCIe link for that device. As mentioned, if the capabilities or state are not as expected, this can also involve requesting capability information from the PCIe device itself. If it is determined 306 that the link status and capability are all valid and as expected, then no further action need to be taken. If, however, the link was not successfully trained or was trained with a degraded state then it can be determined 312 whether a maximum number of retrains (e.g., up to three retrains) has been performed for this link during this boot process. If not, then a retrain can be attempted 316 for that link as discussed and suggested herein. In at least one embodiment, this can involve the BIOS setting a bit in a config space for the host bridge that indicates that a specific link should be retrained.

If the maximum number of retrain attempts has been reached for this link, and the link is still not successfully trained with the appropriate state, then in this example an error can be logged 314 for this link. In other embodiments a remedial action may be taken, such as to call a technician or remove the computing device from service. Once a link is validated or error logged, a determination can be made 308 as to whether there are more cards to be evaluated for this boot process. If so, the process can continue, and if not then the process can move 310 to a next step in the boot process, such as step 208 in FIG. 2.

As illustrated in FIG. 1, some PCIe devices will be located behind PCIe switches or bridges In such implementations, the link to the switch or bridge can be tested, then the individual links from the switch or bridge to the individual PCIe devices can be tested, such as in a recursive manner. In some embodiments, this involves checking every link to a PCIe endpoint, then determining whether there is another link along a communication path to another PCIe endpoint. Such an approach can perform depth checking in at least some embodiments. In some embodiments, a BIOS can be maintained in a hold state during a link retraining process. In some embodiments, a status of link widths and speed can be provided before a handoff from the BIOS to the OS, which can help to isolate the last known BIOS status from OS/driver effects. In some embodiments, a number of link disable and enable attempts can be made after a maximum number of retrain attempts have failed, before rebooting the system.

Figure 4:
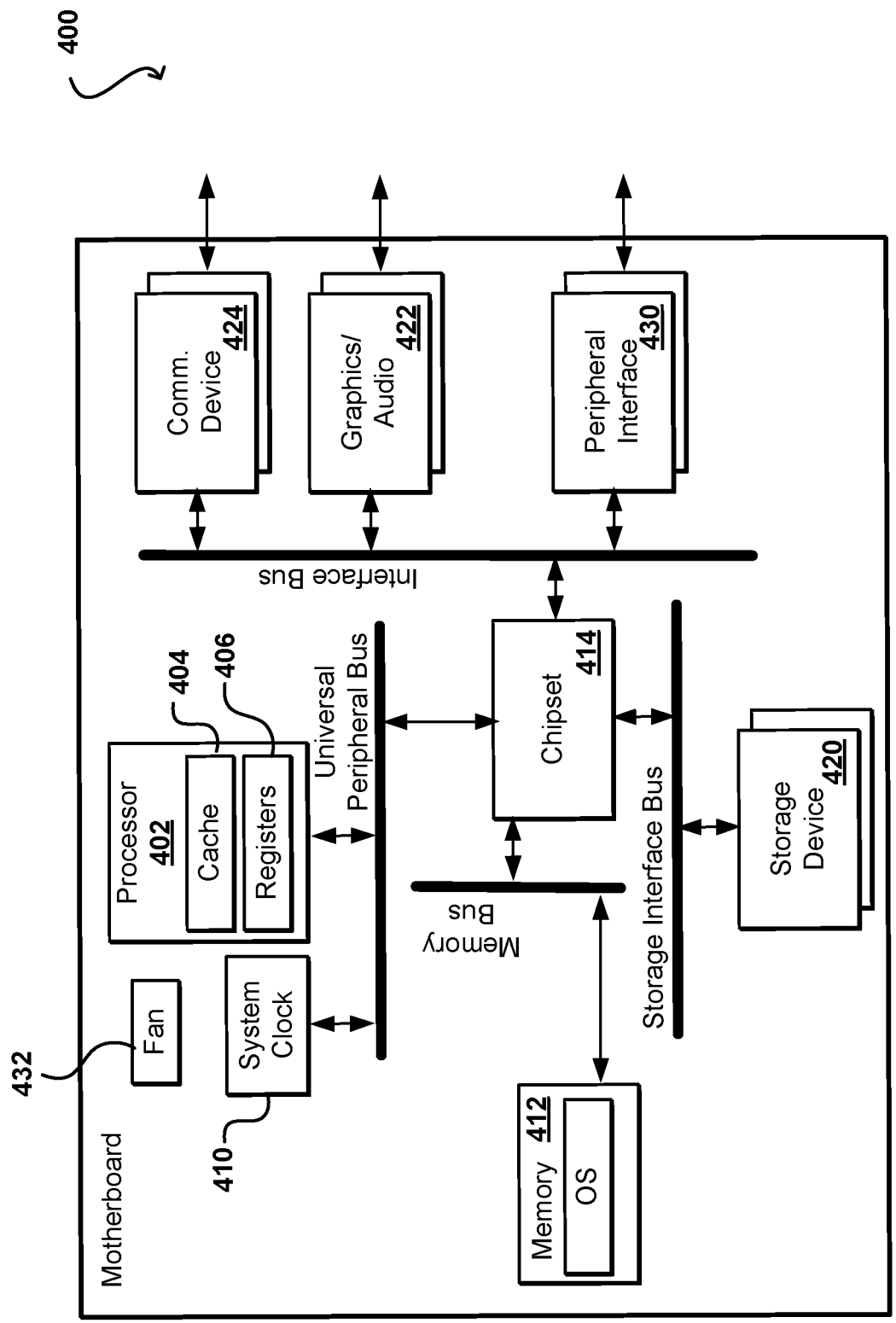
FIG. 4 illustrates additional components of an example computing system that can be utilized in accordance with various embodiments.

FIG. 4 describes further architecture of a computing resource, such as a host machine 102 of FIG. 1, which will generally include at least a set of standard components configured for general purpose operation, although various proprietary components and configurations can be used as well within the scope of the various embodiments. As known for computing devices, the computer will have one or more processors 402, such as central processing units (CPUs), graphics processing units (GPUs), and the like, that are electronically and/or communicatively coupled with various components using various buses, traces, and other such mechanisms. A processor 402 can include memory registers 406 and cache memory 404 for holding instructions, data, and the like. In this example, a chipset 414, which can include a northbridge and southbridge in some embodiments, can work with the various system buses to connect the processor 402 to components such as system memory 416, in the form or physical RAM or ROM, which can include the code for the operating system as well as various other instructions and data utilized for operation of the computing device. The computing device can also contain, or communicate with, one or more storage devices 420, such as hard drives, flash drives, optical storage, and the like, for persisting data and instructions similar, or in addition to, those stored in the processor and memory. The processor 402 can also communicate with various other components via the chipset 414 and an interface bus (or graphics bus), where those components can include communications devices 424 such as cellular modems or network cards, media components 426, such as graphics cards and audio components, and peripheral interfaces 430 for connecting peripheral devices, such as printers, keyboards, and the like. At least one cooling fan 432 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 422 can obtain data from physical memory 416, such as a dynamic random access memory (DRAM) module, via a coherency fabric in some embodiments. It should be understood that various architectures can be utilized for such a computing device, as may include varying selections, numbers, and arguments of buses and bridges within the scope of the various embodiments. The data in memory may be managed and accessed by a memory controller, such as a DDR controller, through the coherency fabric. The data may be temporarily stored in a processor cache 404 in at least some embodiments. The computing device 400 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 430, a communication device 424, a graphics or audio card 426, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 402 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect (PCI), PCIe, or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (IC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a universal peripheral bus or a memory bus), a point-to-point bus such as a PCI or PCI Express bus, etc, in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

Figure 5:
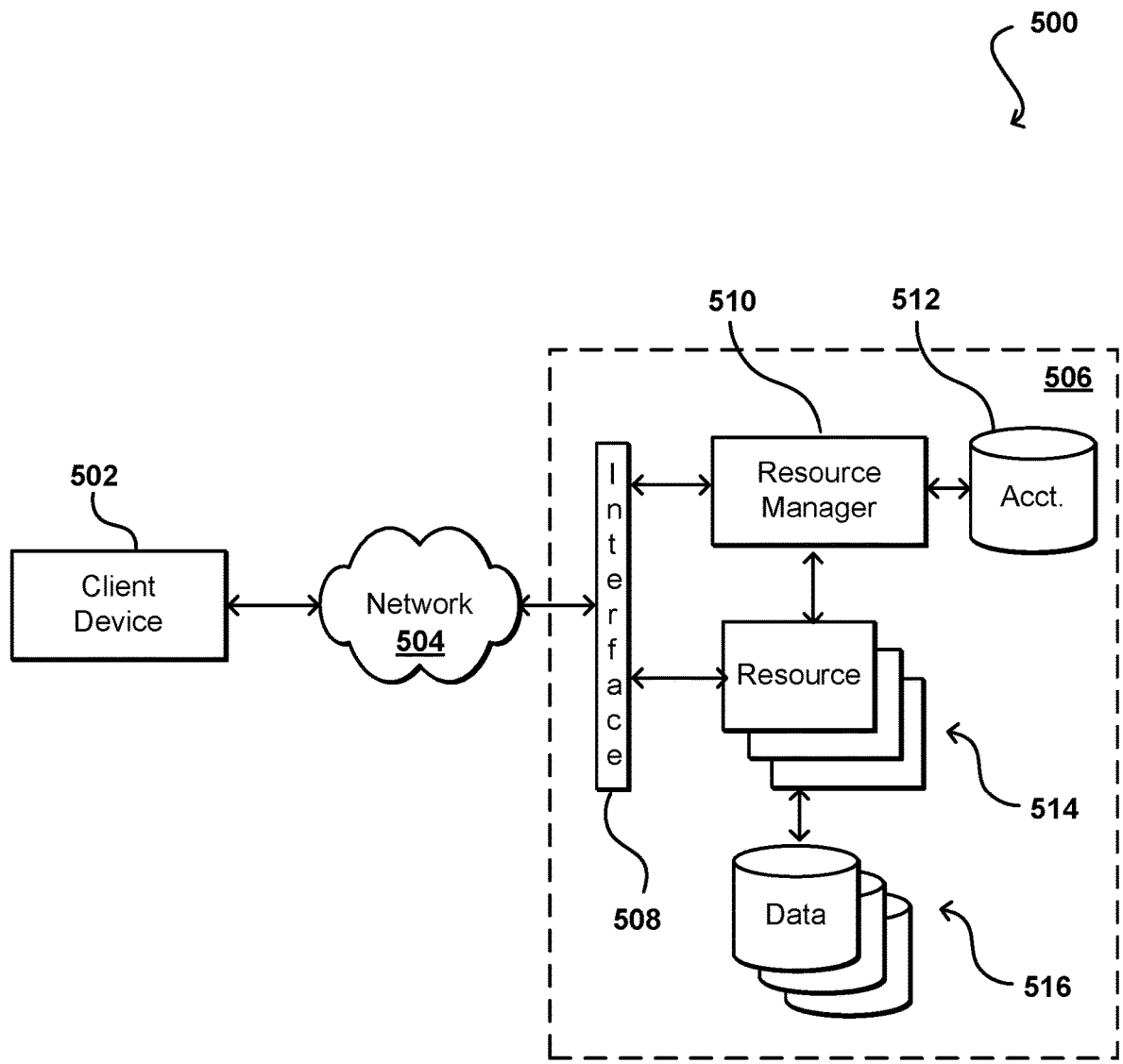
FIG. 5 illustrates an example environment in which aspects of the various embodiments can be implemented.

A computing device such as those discussed herein can be used in some embodiments to provide resource capacity (e.g., compute or storage capacity) for one or more users or customers as part of a shared resource environment. FIG. 5 illustrates an example of one such environment 500 in which aspects of the various embodiments can be implemented. In this example a user is able to utilize a client device 502 to submit requests across at least one network 504 to a multi-tenant resource provider environment 506. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 502 to communicate with an allocated resource without having to communicate with the resource manager 510, at least until such time as a relevant aspect of the user account changes, the user is no longer granted access to the resource, or another such aspect changes.

The resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 6:
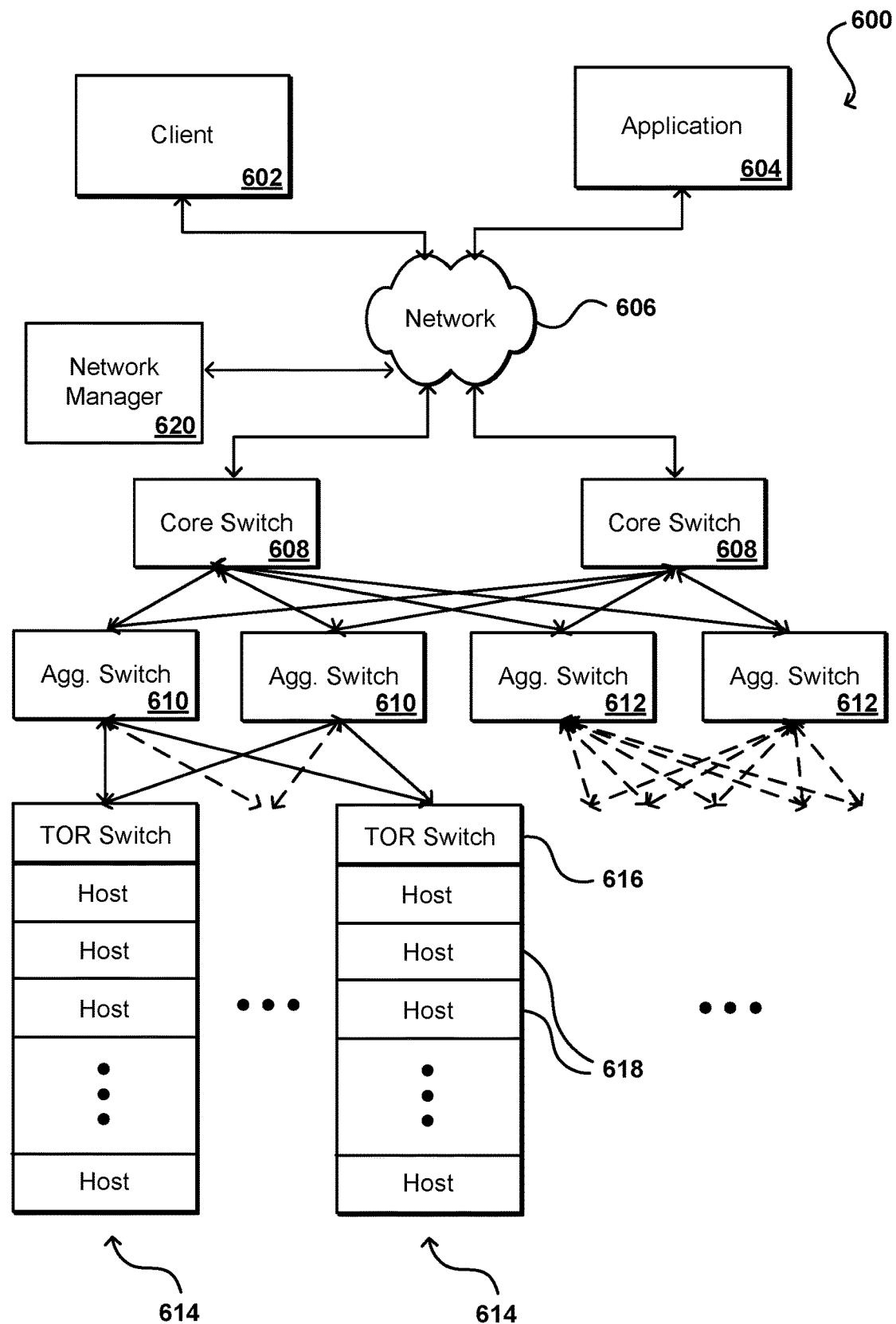
FIG. 6 illustrates components of another example environment that can be used to implement aspects of the various embodiments.

As mentioned, PCIe devices may be utilized in a shared resource environment, such as a data center or server farm. FIG. 6 illustrates an example network configuration 600 that can be used to route communications between specific host machines or other such devices in such an environment. This example shows a typical design that can be used for a data center, wherein a source such as a client device 602 or application 604 is able to send requests across at least one network 606, such as the Internet or a cellular network, to be received by one or more components of the data center. Properties of various components of the network, such as provisioned instances, etc., can be managed using at least one management system, component, or service 620. In this example, the requests are received over the network to one of a plurality of core switches 608, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 608 is able to communicate with each of a plurality of aggregation switches 610, 612, which in at least some embodiments are utilized in pairs. Utilizing aggregation switches in pairs provides a redundant capability in case one or the switches experiences a failure or is otherwise unavailable, such that the other device can route traffic for the connected devices. As can be seen, each core switch in this example is connected to each aggregation switch, such that the tiers in this example are fully connected. Each pair of aggregation switches 610, 612 is linked to a plurality of physical racks 614, each of which typically contains a top of rack (TOR) or "access" switch 616 and a plurality of physical host machines 618, such as data servers and other processing devices. As shown, each aggregation switch can be connected to a number of different racks, each with a number of host machines. For the respective portion of the network, the aggregation pairs are also fully connected to the TOR switches.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as one hundred twenty racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 606. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Various embodiments may utilize at least one network for supporting communications using any of a variety of commercially-available protocols, such as TCP/IP, FTP, UPnP, NFS, and CIFS. The network can be, for example, a local area network (LAN), a wide-area network (WAN), a virtual private network (VPN), the Internet, an intranet, an extranet, a public switched telephone network, an infrared network, a wireless network and any combination thereof.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. Additionally, if a particular decision or action is described as being made or performed "based on" a condition or piece of information, this should not be interpreted as that decision or action being made or performed exclusively based on that condition or piece of information, unless explicitly so stated.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    initiating a boot process for a computing device;
    determining, during the boot process, that a peripheral component interconnect express (PCIe) device is physically connected to the computer device;
    determining that a PCIe link to the PCIe device was not established with proper values for one or more connection parameters;
    retraining the PCIe link, up to a maximum number of retrain attempts, during the boot process to attempt to successfully establish the PCIe link with the proper values;
    performing, in response to the PCIe link not being established with the proper values after the maximum number of retrain attempts, up to a maximum number of reboots of the computing device to attempt to cause the PCIe link to be established successfully with the proper values, the maximum number of reboots being two or more reboots; and
    causing, in response to the PCIe link not being established with the proper values after the maximum number of reboot attempts, a remedial action to be taken with respect to the computing device.

2. The computer-implemented method of claim 1, wherein the boot process is managed by a firmware component on the computing device, and wherein the firmware component is configured to attempt to retrain the PCIe link and perform the reboots if the firmware component determines that the PCIe link has not been established with the proper values.

3. The computer-implemented method of claim 1, wherein the connection parameters include a width and a speed of the PCIe link, and wherein proper values for the proper connection parameters correspond to capabilities of the PCIe link, the PCIe device, and a component of the computing device configured to communicate with the PCIe device over the PCIe link.

4. The computer-implemented method of claim 1, wherein the remedial action includes stopping the boot process, generating a log entry, notifying a technician, or causing the computing device to be removed from a network.

5. The computer-implemented method of claim 1, wherein the PCIe device is a PCIe switch or a PCIe bridge, and further comprising:
    determining whether a second PCIe link from the PCIe device to a second PCIe device was not established with the proper values.

6. A computer-implemented method, comprising:
    determining, by a firmware component managing a boot process of a computing device, that a training process for a communication link between a first device and a second device of the computing device was unsuccessful;
    attempting, during the boot process, to retrain the communication link up to a maximum number of retrain attempts; and
    triggering, in response to the communication link failing to be trained successfully after the maximum number of retrain attempts, up to a maximum number of reboots of the computing device, the maximum number of reboots being two or more reboots.

7. The computer-implemented method of claim 6, further comprising:
    causing, in response to communication link failing to be trained successfully after the maximum number of reboots, a remedial action to be taken with respect to the computing device.

8. The computer-implemented method of claim 7, wherein the remedial action includes stopping the boot process, generating a log entry, notifying a technician, or causing the computing device to be removed from a network.

9. The computer-implemented method of claim 6, wherein the communication link is a peripheral component interconnect express (PCIe) link, and wherein the first device and the second device are PCIe-compatible devices.

10. The computer-implemented method of claim 6, further comprising:
    attempting to retrain the communication link further in response to the communication link being successfully trained but without a proper value for one or more connection parameters.

11. The computer-implemented method of claim 10, wherein the connection parameters include a width and a speed of the communication link, and wherein the proper values for these connection parameters correspond to capabilities of the communication link, the first device, and the second device.

12. The computer-implemented method of claim 6, further comprising:
    determining that the training process for a second communication link between the second device and a third device of the computing device was unsuccessful; and
    attempting, during the boot process, to retrain the second communication link up to a maximum number of retrain attempts.

13. The computer-implemented method of claim 6, wherein the firmware component is a basic input/output (BIOS) component, a baseboard management controller (BMC) component, or a unified extensible firmware interface (UEFI) component.

14. A non-transitory computer-readable storage medium including instructions that, when executed by one or more processors of a computing device, cause the computing device to:
  determine, by a firmware component managing a boot process of the computing device, that a training process for a communication link between a first device and a second device of the computing device was unsuccessful;
  attempt, during the boot process, to retrain the communication link up to a maximum number of retrain attempts; and
  trigger, in response to the communication link failing to be trained successfully after the maximum number of retrain attempts, up to a maximum number of reboots of the computing device, the maximum number of reboots being two or more reboots.

15. The non-transitory computer-readable storage medium of claim 14, wherein the instructions when executed further cause the computing device to:
  cause, in response to communication link failing to be trained successfully after the maximum number of reboots, a remedial action to be taken with respect to the computing device, wherein the remedial action includes stopping the boot process, generating a log entry, notifying a technician, or causing the computing device to be removed from a network.

16. The non-transitory computer-readable storage medium of claim 14, wherein the instructions when executed further cause the computing device to:
  determine that the training process for a second communication link between the second device and a third device of the computing device was unsuccessful; and
  attempt, during the boot process, to retrain the second communication link up to a maximum number of retrain attempts.

17. The non-transitory computer-readable storage medium of claim 14, wherein the communication link is a peripheral component interconnect express (PCIe) link, and wherein the first device and the second device are PCIe-compatible devices.

18. The non-transitory computer-readable storage medium of claim 14, wherein the instructions when executed further cause the computing device to:
  attempt to retrain the communication link further in response to the communication link being successfully trained but without a proper value for one or more connection parameters, wherein the connection parameters include a width and a speed of the communication link, and wherein the proper values for these connection parameters correspond to capabilities of the communication link, the first device, and the second device.

* * * * *